US012782265B2

(12) United States Patent
Ishihara

(10) Patent No.: US 12,782,265 B2
(45) Date of Patent: Nov. 3, 2026

(54) DETECTION DEVICE

(71) Applicant: Japan Display Inc., Tokyo (JP)

(72) Inventor: Tomoyuki Ishihara, Tokyo (JP)

(73) Assignee: Japan Display Inc., Tokyo (JP)

(*) Notice: Subject to any disclaimer, the term of this patent is extended or adjusted under 35 U.S.C. 154(b) by 183 days.

(21) Appl. No.: 18/783,649

(22) Filed: Jul. 25, 2024

(65) Prior Publication Data

US 2025/0044216 A1 Feb. 6, 2025

(30) Foreign Application Priority Data

Aug. 3, 2023 (JP) ................................ 2023-127260

(51) Int. Cl.
*G01N 21/03* (2006.01)
*G01N 21/17* (2006.01)

(52) U.S. Cl.
CPC . *G01N 21/0303* (2013.01); *G01N 2021/0339* (2013.01); *G01N 2021/1765* (2013.01); *G01N 2201/08* (2013.01)

(58) Field of Classification Search
CPC ... G01N 2021/0339; G01N 2021/1765; G01N 21/0303; G01N 2201/08; G01R 19/175; G01R 19/2513; G01R 29/02; G02B 6/0043; G05F 1/561; G06V 10/141; G06V 20/693
USPC .......................................................... 356/244
See application file for complete search history.

(56) References Cited

U.S. PATENT DOCUMENTS

2011/0122094 A1* 5/2011 Tsang .................... G06F 3/0428 345/175
2022/0026271 A1* 1/2022 Margalit ................... G01J 3/36
2023/0082539 A1* 3/2023 Borremans ............... G01J 3/26 348/135
2023/0110294 A1* 4/2023 Cho ................... G01N 15/1459 250/458.1

FOREIGN PATENT DOCUMENTS

JP 6830593 B2 2/2021

* cited by examiner

*Primary Examiner* — Tri T Ton
(74) *Attorney, Agent, or Firm* — K&L Gates LLP

(57) ABSTRACT

According to an aspect, a detection device includes: a placement substrate capable of having an object to be detected placed thereon; a light guide plate that is disposed on one side in a first direction of the placement substrate so as to overlap the placement substrate and has a light-transmitting property; an optical sensor that is disposed on one side in the first direction of the light guide plate so as to overlap the light guide plate and includes a plurality of photodetection elements arranged in a planar configuration; and a light source that is disposed adjacent to the light guide plate in a second direction intersecting the first direction and is configured to emit light to a side surface of the light guide plate.

17 Claims, 10 Drawing Sheets

DETECTION DEVICE

CROSS-REFERENCE TO RELATED APPLICATION

This application claims the benefit of priority from Japanese Patent Application No. 2023-127260 filed on Aug. 3, 2023, the entire contents of which are incorporated herein by reference.

BACKGROUND

1. Technical Field

What is disclosed herein relates to a detection device.

2. Description of the Related Art

Japanese Patent No. 6830593 (JP-6830593) discloses a biosensor that includes an optical sensor including a photosensor (photodetection element), a culture vessel placed on the upper side of an imaging surface of the photosensor, and a point light source disposed above the culture vessel. In the biosensor of JP-6830593, light emitted from the point light source passes through a culture medium and a plurality of objects to be detected (microbes), and enters the photosensor.

The biosensor of JP-6830593 may difficult to detect the objects to be detected (microbes) if the culture medium in the culture vessel has low optical transmittance.

For the foregoing reasons, there is a need for a detection device that improves accuracy of detection of objects to be detected.

SUMMARY

According to an aspect, a detection device includes: a placement substrate capable of having an object to be detected placed thereon; a light guide plate that is disposed on one side in a first direction of the placement substrate so as to overlap the placement substrate and has a light-transmitting property; an optical sensor that is disposed on one side in the first direction of the light guide plate so as to overlap the light guide plate and includes a plurality of photodetection elements arranged in a planar configuration; and a light source that is disposed adjacent to the light guide plate in a second direction intersecting the first direction and is configured to emit light to a side surface of the light guide plate.

DETAILED DESCRIPTION

Figure 1:
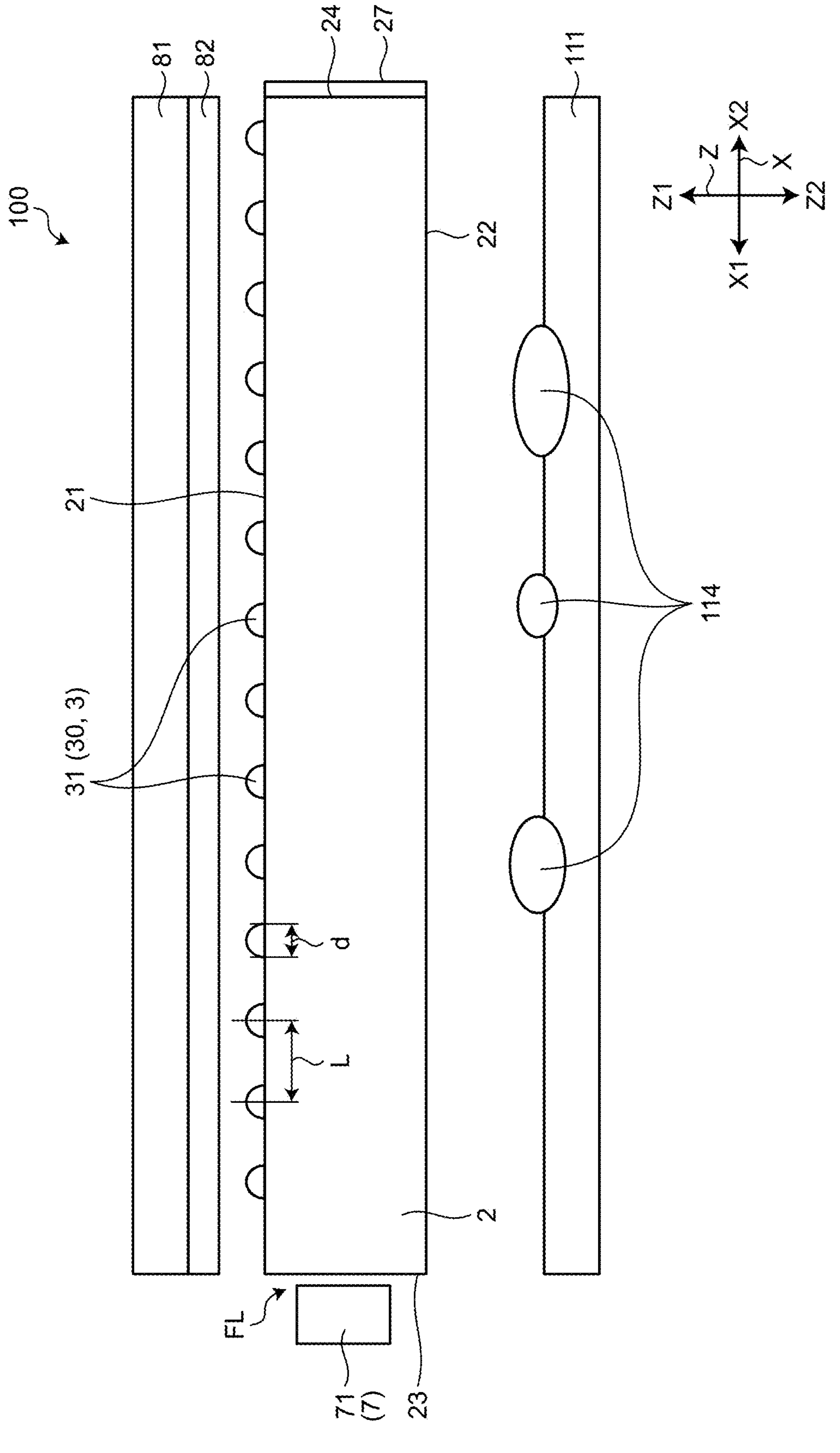
FIG. 1 is a side view schematically illustrating a detection device according to a first embodiment of the present disclosure.

The following describes a mode (embodiment) for carrying out the present disclosure in detail with reference to the drawings. The present disclosure is not limited to the description of the embodiment given below. Components described below include those easily conceivable by those skilled in the art or those substantially identical thereto. In addition, the components described below can be combined as appropriate. What is disclosed herein is merely an example, and the present disclosure naturally encompasses appropriate modifications easily conceivable by those skilled in the art while maintaining the gist of the present disclosure.

To further clarify the description, the drawings may schematically illustrate, for example, widths, thicknesses, and shapes of various parts as compared with actual aspects thereof. However, they are merely examples, and interpretation of the present disclosure is not limited thereto. The same component as that described with reference to an already mentioned drawing is denoted by the same reference numeral through the present disclosure and the drawings, and detailed description thereof may not be repeated where appropriate.

In XYZ coordinates in the drawings, a Z direction (first direction) corresponds to the up-down direction; an X direction (second direction) corresponds to the right-left direction; and a Y direction (second direction) corresponds to the front-rear direction. The X direction intersects (is orthogonal to) the Y and Z directions; the Y direction intersects (is orthogonal to) the X and Z directions; and the Z direction intersects (is orthogonal to) the X and Y directions. A Z1 side is one side in the first direction, and a Z2 side is the other side in the first direction.

First Embodiment

Figure 2:
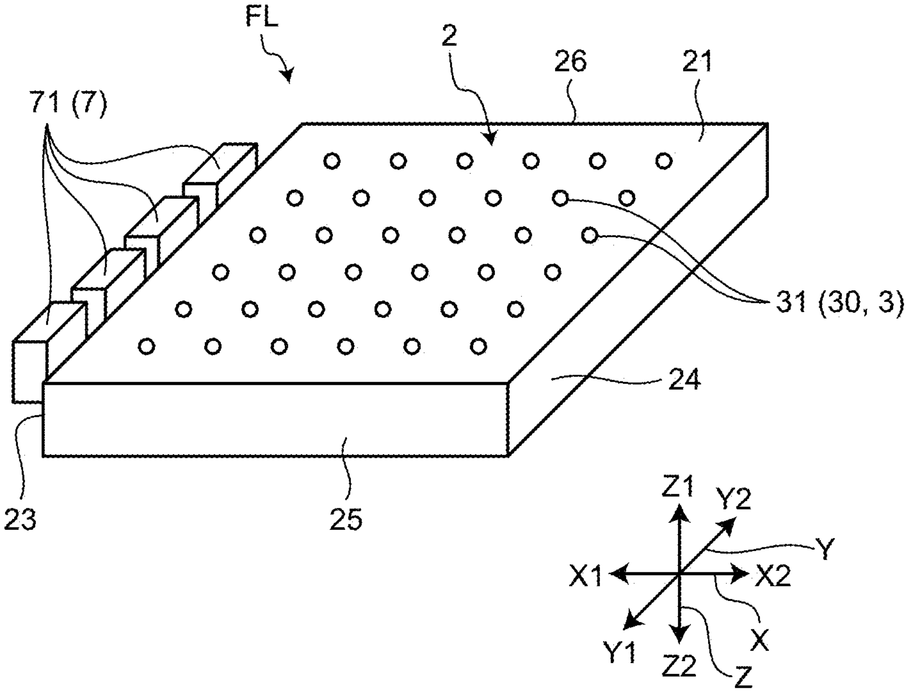
FIG. 2 is a perspective view schematically illustrating a front light according to the first embodiment.

First, a first embodiment of the present disclosure will be described. FIG. 1 is a side view schematically illustrating a detection device according to the first embodiment. FIG. 2 is a perspective view schematically illustrating a front light according to the first embodiment.

As illustrated in FIGS. 1 and 2, a detection device 100 includes a placement substrate 111, a front light FL, an optical sensor 81, and an optical filter 82. The front light FL includes a light guide plate 2, a light source device 7, and an optical structure 3. That is, in other words, the detection device 100 includes the placement substrate 111, the light guide plate 2, the light source device 7, the optical structure 3, the optical sensor 81, and the optical filter 82.

As illustrated in FIG. 1, the placement substrate 111 is a container, such as a Petri dish, and a culture medium. An object to be detected 114 is the culture medium and microbes, such as bacteria, generated in the culture medium, or a sample including the microbes. The object to be detected 114 is not limited to the bacteria and may be other micro-objects such as cells.

As illustrated in FIG. 1, the light guide plate 2 is disposed on the Z1 side (one side in the first direction) of the placement substrate 111 so as to overlap the placement substrate 111. The light guide plate 2 has a light-transmitting property. As illustrated in FIG. 2, the light guide plate 2 is a flat plate member. The light guide plate 2 has a first surface 21, a second surface 22, and side surfaces 23, 24, 25, and 26. The first surface 21 is a principal surface on the Z1 side, and the second surface 22 is a surface on the opposite side to the first surface 21 (that is, the Z2 side thereof). The side surface 23 is located on an X1 side; the side surface 24 is located on an X2 side; the side surface 25 is located on a Y1 side; and the side surface 26 is located on a Y2 side.

As illustrated in FIG. 1, a reflective plate 27 is bonded to the side surface 24. The reflective plate 27 reflects light 120 propagating in the light guide plate 2 to restrain the light 120 from leaking from the side surface 24 toward outside the light guide plate 2.

As illustrated in FIGS. 1 and 2, the light source device 7 faces the side surface 23 of the light guide plate 2. The light source device 7 is located on the X1 side of the side surface 23 of the light guide plate 2. The light source device 7 emits the light 120 (refer to FIG. 5) to the side surface 23 of the light guide plate 2. The light source device 7 is composed of a plurality of light sources 71, for example. The light sources 71 are a plurality of light-emitting diodes (LEDs), for example. That is, the light sources 71 are arranged along the Y direction and arranged so as to face the side surface 23 of the light guide plate 2.

As illustrated in FIG. 1, the optical structure 3 is provided on the first surface 21 of the light guide plate 2. The optical structure 3 emits the light 120 (refer to FIG. 5) that has entered the light guide plate 2 toward the Z2 side (placement substrate side). The optical structure 3 is, for example, a scatterer 30 including a protruding scatterer 31. In the first embodiment, an example will be described in which the protruding scatterer 31 is applied as the optical structure 3. The protruding scatterer 31 is a hemispherical light-transmitting member that projects toward the Z1 side from the first surface 21 of the light guide plate 2. That is, when viewed in the Z direction, the protruding scatterer 31 has a circular shape having a first diameter d. In the present disclosure, the shape of the protruding scatterer 31 as viewed in the Z direction is not limited to a circular shape, and the examples thereof include also other shapes such as a polygonal shape. Part of the light 120 propagating in the light guide plate 2 is scattered by the protruding scatterers 31. The protruding scatterers 31 are arranged in a matrix having a row-column configuration along the X and Y directions as illustrated in FIG. 2. The distance between a pair of the protruding scatterers 31 adjacent in the X direction is a distance L. The distance between a pair of the protruding scatterers 31 adjacent in the Y direction is also the distance L. Thus, the protruding scatterers 31 are arranged at even intervals in the X and Y directions. The distance L that is the minimum distance between the protruding scatterers 31 is equal to or larger than three times the first diameter d. The scatterer 30 may be recessed instead of protruding.

As illustrated in FIG. 1, the optical sensor 81 and the optical filter 82 are disposed on the Z1 side of the light guide plate 2 so as to overlap the light guide plate 2. The optical sensor 81 is located on the Z1 side of the optical filter 82. That is, the optical filter 82 is located between the optical sensor 81 and the light guide plate 2. The optical sensor 81 will be described later.

Figure 3A:
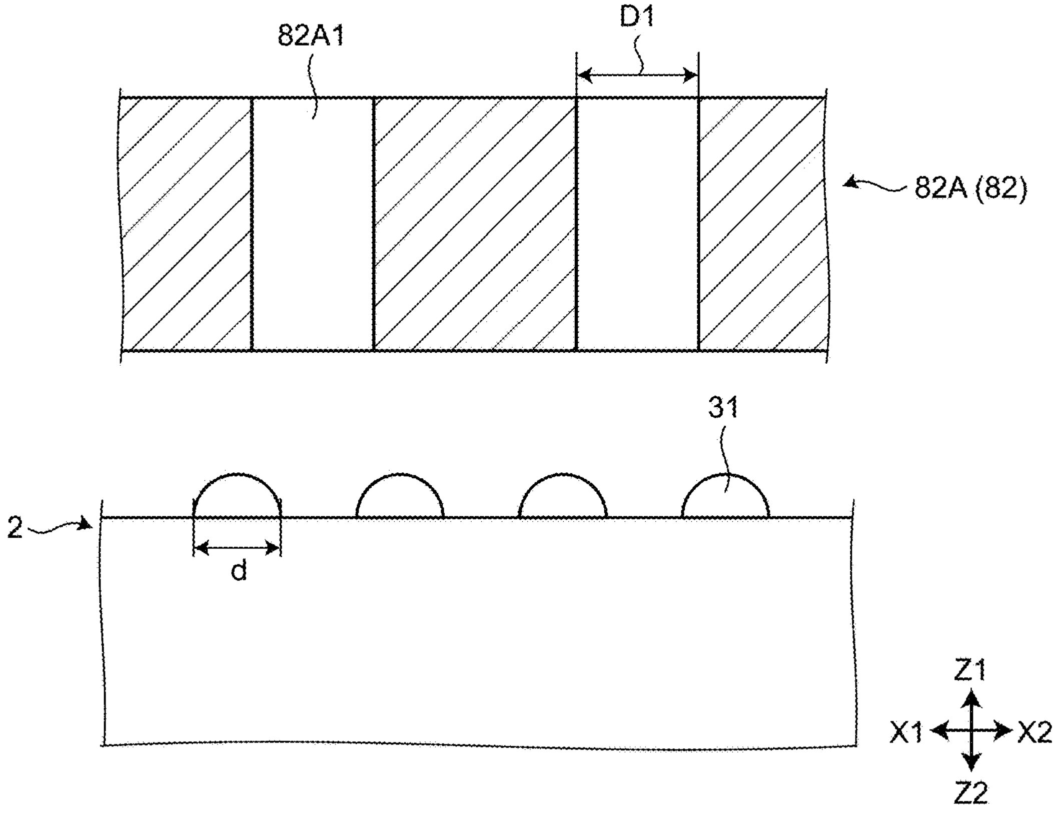
FIG. 3A is a schematic view enlarging a section of a collimator and a light guide plate as one example of an optical filter.
Figure 3B:
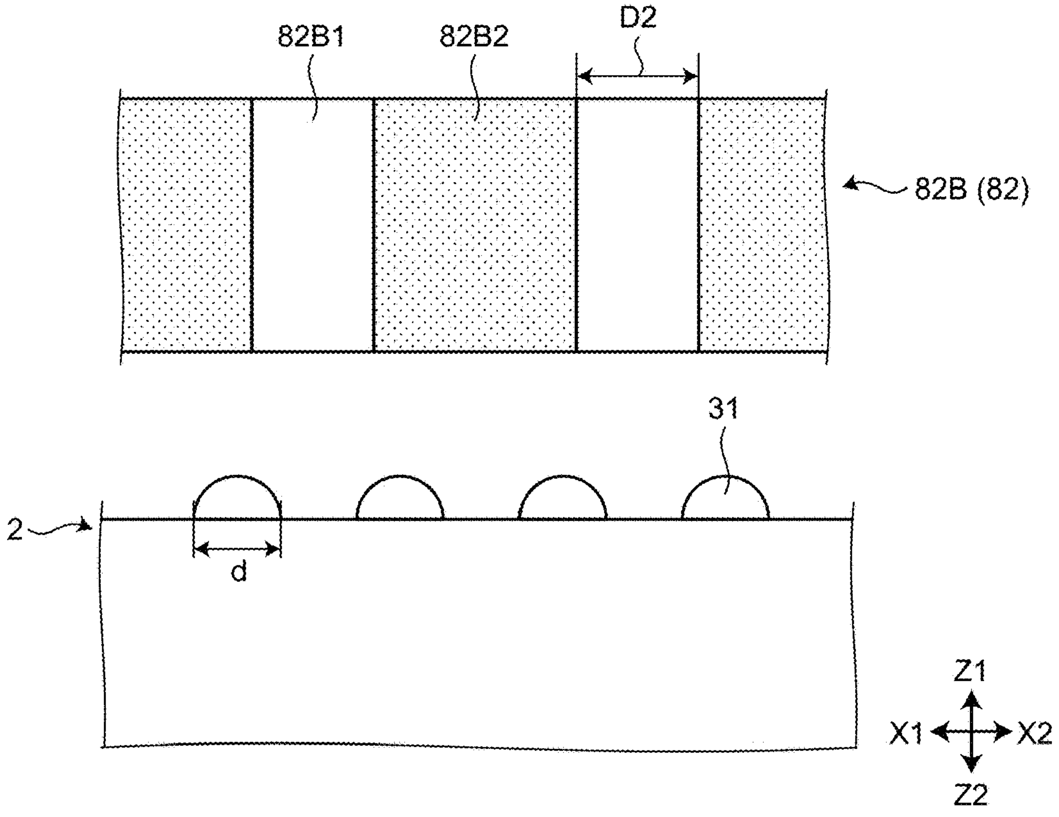
FIG. 3B is a schematic view enlarging a section of a louver and the light guide plate as one example of the optical filter.

The following describes the optical filter 82. The optical filter 82 is an optical element that transmits part of the light 120 reflected by the object to be detected 114 and traveling in the Z direction, toward the optical sensor 81. The optical filter 82 includes light-blocking portions and light guide portions. The light-blocking portions have higher light absorbance than the light guide portions. Examples of the optical filter 82 include a collimator 82A (collimating apertures) illustrated in FIG. 3A and a louver 82B illustrated in FIG. 3B. FIG. 3A is a schematic view enlarging a section of the collimator and the light guide plate as one example of the optical filter. FIG. 3B is a schematic view enlarging a section of the louver and the light guide plate as one example of the optical filter.

As illustrated in FIG. 3A, the collimator 82A includes cylindrical holes 82A1 (light guide portions) extending along the Z direction. The holes 82A1 transmit the light 120 reflected by the object to be detected 114 toward the optical sensor 81. A diameter D1 (maximum distance along the X direction in the section) of each of the holes 82A1 is larger than the first diameter d of the protruding scatterer 31.

As illustrated in FIG. 3B, the louver 82B includes plate-like light-blocking portions 82B2 and light guide portions 82B1. The light-blocking portions 82B2 and the light guide portions 82B1 extend in the Z direction. The light-blocking portions 82B2 and the light guide portions 82B1 are alternately arranged along the X direction. The light-blocking portions 82B2 have higher light absorbance than the light guide portions 82B1. The light guide portions 82B1 transmit the light 120 reflected by the object to be detected 114 toward the optical sensor 81. A thickness D2 along the X direction (maximum distance along the X direction in the section) of each of the light guide portions 82B1 is larger than the first diameter d of the protruding scatterer 31.

Figure 4:
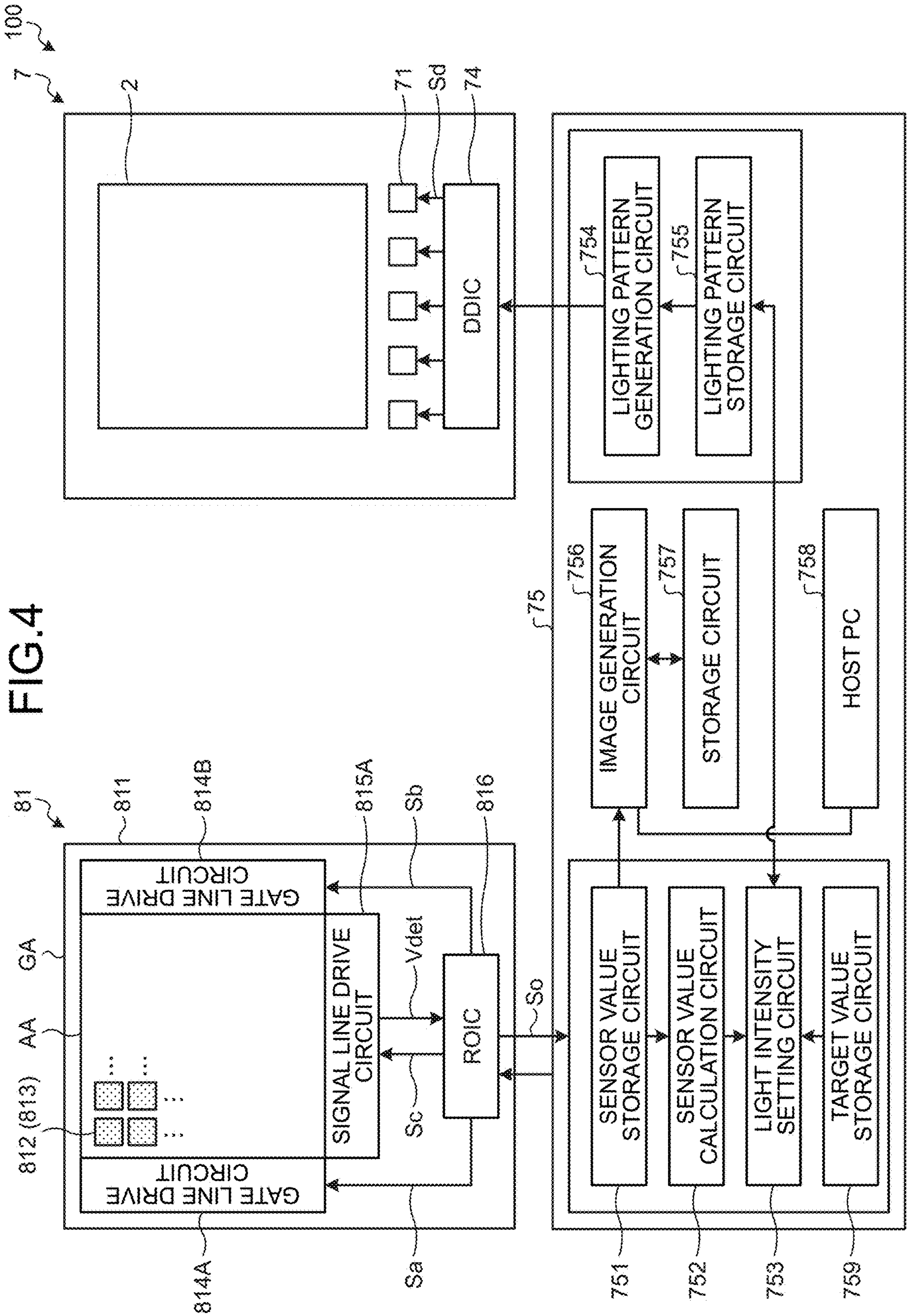
FIG. 4 is a block diagram illustrating a configuration example of the detection device according to the first embodiment.

FIG. 4 is a block diagram illustrating a configuration example of the detection device according to the first embodiment. As illustrated in FIG. 4, the detection device 100 includes the optical sensor 81, the light source device 7, and a host integrated circuit (IC) 75 that controls the light source device 7. The optical sensor 81 includes an array substrate 811, a plurality of sensor pixels 812 (photodiodes 813) formed on the array substrate 811, gate line drive circuits 814A and 814B, a signal line drive circuit 815A, and a detection control circuit (ROIC) 816.

The array substrate 811 is formed using a substrate as a base. Each of the sensor pixels 812 is configured with a corresponding one of the photodiodes 813, a plurality of transistors, and various types of wiring.

The array substrate 811 has a detection region AA and a peripheral region GA. The detection region AA is a region provided with the sensor pixels 812 (photodiodes 813). The peripheral region GA is a region between the outer perimeter of the detection region AA and the outer edges of the array substrate 811, and is a region not provided with the sensor pixels 812. The gate line drive circuits 814A and 814B, the signal line drive circuit 815A, and the detection control circuit 816 are provided in the peripheral region GA.

Each of the sensor pixels 812 is an optical sensor that includes the photodiode 813 as a sensor element. Each of the photodiodes 813 outputs an electrical signal corresponding to light emitted thereto.

The detection control circuit 816 is a circuit that supplies control signals Sa, Sb, and Sc to the gate line drive circuits 814A and 814B and the signal line drive circuit 815A, respectively, to control operations of these circuits. The detection control circuit 816 includes a signal processing circuit that processes a detection signal Vdet from each of the photodiodes 813.

The detection control circuit 816 processes the detection signals Vdet from the photodiodes 813, and outputs sensor values So based on the detection signals Vdet to the host IC 75. Through this operation, the detection device 100 detects information on the object to be detected 114.

The light source device 7 includes the light sources 71 and a light-emitting element control circuit 74.

As described above, the light sources 71 are located so as to face the side surface 23 of the light guide plate 2. The light sources 71 are driven between on (lit state) and off (unlit state) by a command Sd of the light-emitting element control circuit 74.

The host IC 75 includes, as a control circuit for the optical sensor 81, a sensor value storage circuit 751, a sensor value calculation circuit 752, a light intensity setting circuit 753, a target value storage circuit 759, a storage circuit 757, and a host personal computer (PC) 758. The sensor value storage circuit 751 stores therein the sensor values So output from the detection control circuit 816 of the optical sensor 81. The sensor value calculation circuit 752 performs a predetermined calculation process on the sensor values So of the photodiodes 813.

In a light intensity setting mode, the light intensity setting circuit 753 compares the sensor values So detected by the photodiodes 813 with a preset target sensor value So-t acquired from the target value storage circuit 759 to set light intensities of the light sources 71 for detection. The target value storage circuit 759 stores therein the preset target sensor value So-t.

The host IC 75 includes, as a control circuit for the light source device 7, a lighting pattern generation circuit 754 and a lighting pattern storage circuit 755. The lighting pattern storage circuit 755 stores therein information on the light intensity of each of the light sources 71 in the light intensity setting mode.

The lighting pattern generation circuit 754 generates various control signals based on the information on the light intensity in the lighting pattern storage circuit 755.

In a detection mode, an image generation circuit 756 generates an image of the object to be detected 114 based on the sensor values So output from the photodiodes 813.

The host IC 75 further includes the storage circuit 757. The storage circuit 757 stores therein base image data. The base image data is data obtained by detecting, by the optical sensor 81, the light emitted from the light sources 71 when the object to be detected 114 is not placed on the placement substrate 111. The base image data may indicate substantially the same reflectance as that of the placement substrate on which nothing is placed. That is, the base image data may be obtained by, for example, placing a subject having uniform reflectance within a detection surface (such as a black board or a white board) and detecting the subject.

Figure 5:
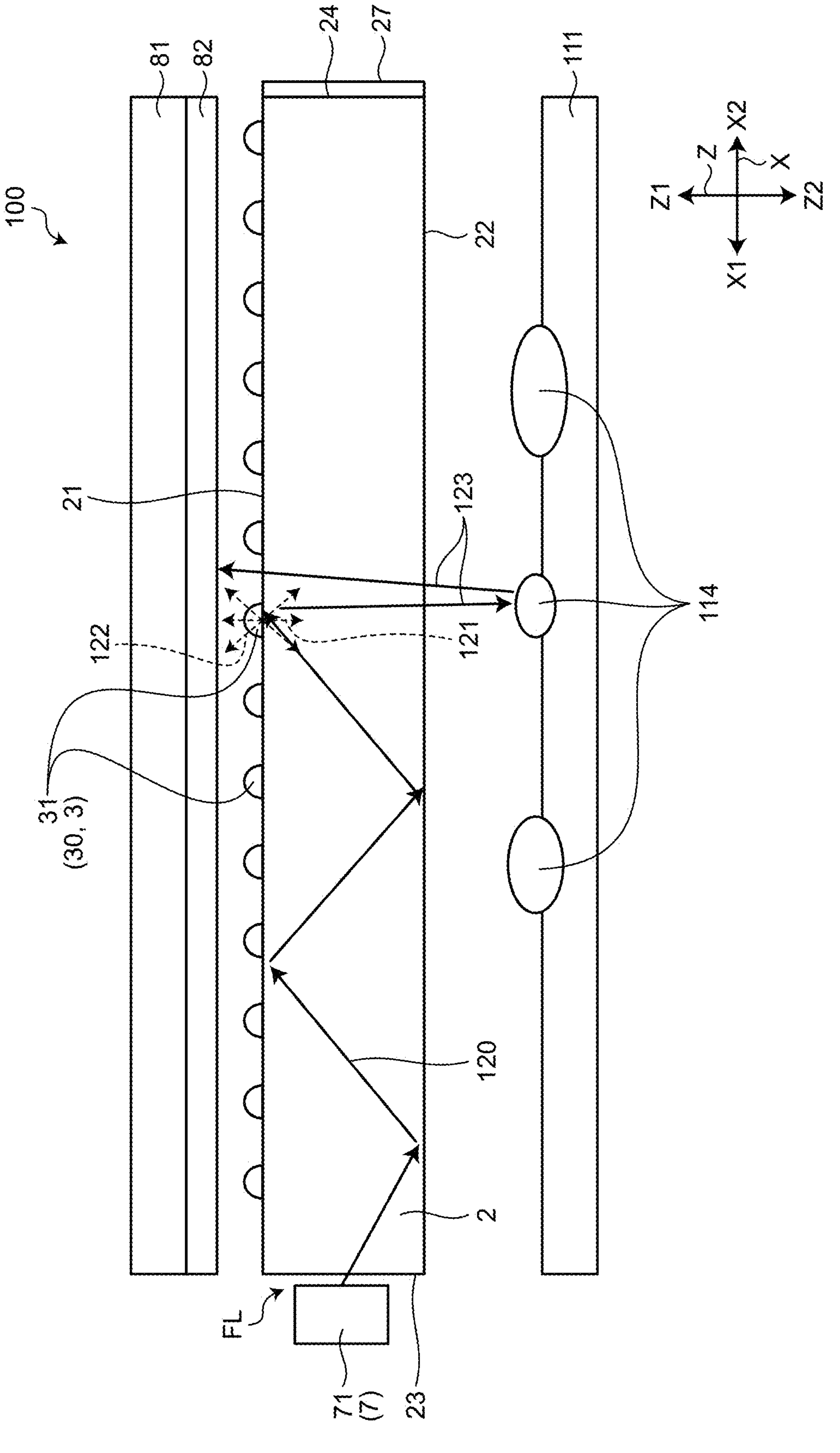
FIG. 5 is a side view schematically illustrating propagation of light in the light guide plate.

The following describes the propagation of the light. FIG. 5 is a side view schematically illustrating the propagation of the light in the light guide plate. As illustrated in FIG. 5, the light 120 emitted from the light sources 71 enters the inside of the light guide plate 2 from the side surface 23 of the light guide plate 2 and propagates in the light guide plate 2 while being totally reflected repeatedly on the first surface 21 and the second surface 22. Part of the light 120 propagating in the light guide plate 2 is scattered by the protruding scatterer 31 and becomes scattered light 121. Light 123 as part of the scattered light 121 is output from the second surface 22 of the light guide plate 2 to the object to be detected 114 and then reflected by the object to be detected 114. The reflected light is transmitted through the light guide plate 2 and the optical filter 82 to the photodiodes 813 of the optical sensor 81. The scattered light 121 scattered by the protruding scatterer 31 includes also light 122 that is output to the optical filter 82 facing the light guide plate 2, other than the light 123 that is output toward the object to be detected 114.

Figure 6:
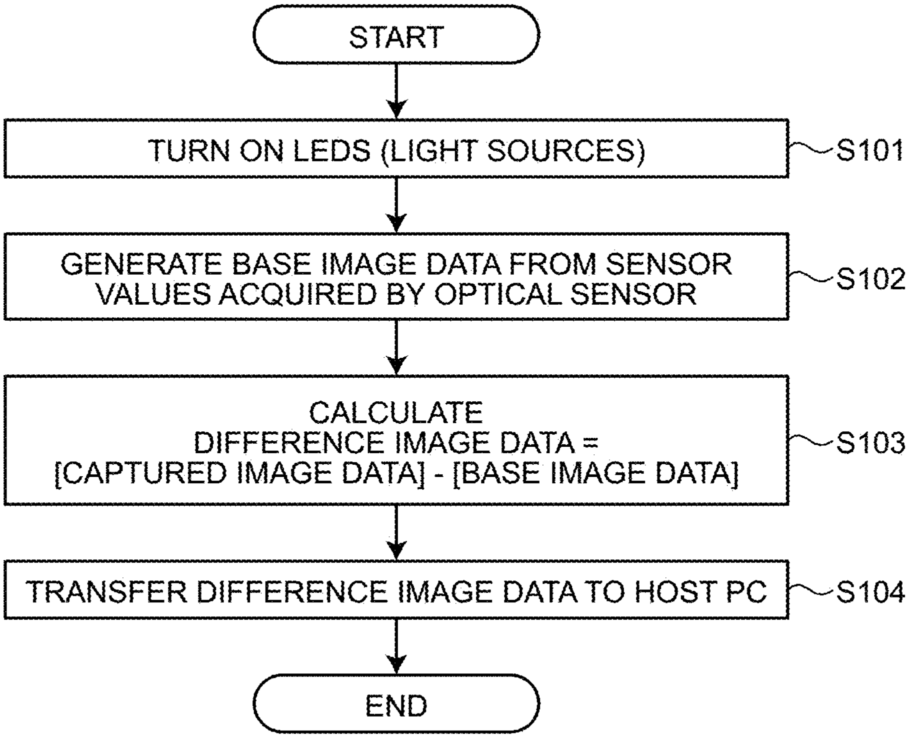
FIG. 6 is a flowchart illustrating a detection operation example of the detection device according to the first embodiment.

The following describes a detection operation example of the detection device with reference to FIG. 6 and other drawings. FIG. 6 is a flowchart illustrating the detection operation example of the detection device according to the first embodiment.

First, the light source device 7 turns on the light sources 71 based on a control signal from the lighting pattern generation circuit 754 (refer to FIG. 4) (Step S101).

Then, when the object to be detected 114 is not placed on the placement substrate 111, the base image data obtained by detecting the light emitted from the light sources 71 using the optical sensor 81 is generated (Step S102). The base image data is stored in the storage circuit 757 (refer to FIG. 4).

Then, difference image data is calculated (Step S103). The difference image data is data obtained by subtracting the base image data from captured image data. Specifically, when the object to be detected 114 is placed on the placement substrate 111, the captured image data obtained by detection using the optical sensor 81 is acquired, and then, based on the difference between the base image data and the captured image data, the difference image data indicating the detection result when the object to be detected 114 is placed on the placement substrate 111 is obtained. The difference image data is calculated by the image generation circuit 756 (refer to FIG. 4). The difference image data is then transferred to the host PC (Step S104).

As described above, the detection device 100 includes the placement substrate 111 capable of having the object to be detected 114 placed thereon, the light guide plate 2, the optical sensor 81 including the photodiodes (photodetection elements) 813, and the light sources 71 that emit the light 120 to the side surface 23 of the light guide plate 2.

As described above, in JP-6830593, the culture medium serving as the placement substrate and the object to be detected are placed between the optical sensor and the light source. Therefore, if the placement substrate has low optical transmittance, the object to be detected may be difficult to be detected.

In contrast, in the present embodiment, the light sources 71 are arranged facing the side surface 23 of the light guide plate 2; the optical sensor 81 is disposed on the first surface 21 side of the light guide plate 2; and the object to be detected 114 is placed on the second surface 22 side of the light guide plate 2. Therefore, the light 120 reflected by the object to be detected 114 passes through the light guide plate 2 and reaches the photodiodes (photodetection elements) 813 regardless of the degree of optical transmittance of the placement substrate 111. Thus, according to the present embodiment, the detection device 100 that improves the accuracy of detection of the object to be detected 114 can be provided.

The light guide plate 2 is provided with the optical structure 3 that transmits the light 120 toward the placement substrate 111. The light 120 emitted from the light sources 71 enters the inside of the light guide plate 2 from the side surface 23 of the light guide plate 2 and propagates in the light guide plate 2 while being totally reflected repeatedly on the first surface 21 and the second surface 22. Therefore, by providing the optical structure 3, part of the light 120 can be transmitted toward the placement substrate 111. The light 120 transmitted toward the placement substrate 111 is reflected by the object to be detected 114 and reaches the photodiodes (photodetection elements) 813 through the light guide plate 2. As a result, the accuracy of detection of the object to be detected 114 increases.

The optical structure 3 is not limited to the protruding scatterer 31 or a recessed scatterer 32 to be described later, and may also be a structure formed by injecting ink dots or a structure formed by machining such as cutting.

A plurality of the optical structures 3 are provided on the first surface 21 of the light guide plate 2 on the optical sensor 81 side thereof.

Since this configuration allows the light 120 propagating in the light guide plate 2 to be output toward the object to be detected 114 placed on the opposite side to the optical sensor 81 side, the accuracy of detection of the object to be detected 114 increases.

The optical structure 3 is the scatterer 30 that scatters the light 120 that propagates through the light guide plate 2. Thus, the scatterer 30 scatters the light 120, so that the light 120 propagating in the light guide plate 2 can be emitted toward the object to be detected 114 placed on the opposite side to the optical sensor 81 side. Therefore, the accuracy of detection of the object to be detected 114 increases.

The scatterer 30 has a circular shape having the first diameter d when viewed in the Z direction. The minimum distance L between adjacent two of the scatterers 30 is equal to or larger than three times the first diameter d.

When the scatterers 30 are densely arranged, the light 120 reflected by the object to be detected 114 and transmitted through the light guide plate 2 toward the photodiodes (photodetection elements) 813 is diffusely reflected again by the dense scatterers 30, which reduces the amount of the light 120 reaching the photodiodes 813. Therefore, the degree of density of the scatterers 30 is preferably lower. For example, the minimum distance L between adjacent two of the scatterers 30 is preferably equal to or larger than three times the first diameter d. The above-mentioned magnitude relations among dimensions such as distance, diameter, and thickness are summarized as follows: distance L>diameter D1 (thickness D2)>3d.

The optical filter 82 is provided between the light guide plate 2 and the optical sensor 81.

The optical filter 82 causes a larger amount of the light 120 reflected by the object to be detected 114 and transmitted through the light guide plate 2 to travel toward the photodiodes 813. As a result, the accuracy of detection of the object to be detected 114 can further increase.

The optical filter 82 includes the light-blocking portions and the light guide portions. The light-blocking portions have higher light absorbance than the light guide portions. The optical filter 82 is, for example, the collimator 82A that includes the cylindrical holes 82A1 (light guide portions). The scatterer 30 has a circular shape having the first diameter d when viewed in the Z direction. The diameter D1 (maximum distance along the X direction) of the hole 82A1 (light guide portion) is larger than the first diameter d.

Since this configuration further facilitates the light 120 reflected by the object to be detected 114 and transmitted through the light guide plate 2 to pass through the hole 82A1 of the collimator 82A, the accuracy of detection of the object to be detected 114 can further increase.

The optical filter 82 includes the louver 82B. The thickness D2 of the light guide portion 82B1 (maximum distance along the X direction) is larger than the first diameter d of the scatterer 30. Since this configuration further facilitates the light 120 reflected by the object to be detected 114 and transmitted through the light guide plate 2 to pass through the light guide portion 82B1 of the louver 82B, the accuracy of detection of the object to be detected 114 can further increase.

The detection device 100 includes the storage circuit 757 that stores therein the base image data and the image generation circuit 756 that obtains the difference image data from the difference between the base image data and the captured image data.

The captured image data is data obtained by detecting the light emitted from the light sources using the optical sensor 81 when the object to be detected 114 is placed on the placement substrate 111. The captured image data includes the base image data obtained by detecting the light using the optical sensor 81 when the object to be detected 114 is not placed on the placement substrate 111. That is, the base image data does not include data obtained by detecting the light reflected from the object to be detected 114 using the optical sensor 81. Therefore, since the difference image data is obtained from the difference between the base image data and the captured image data, higher accuracy of detection can be achieved with the detection device 100 according to the present embodiment.

First Modification

Figure 7:
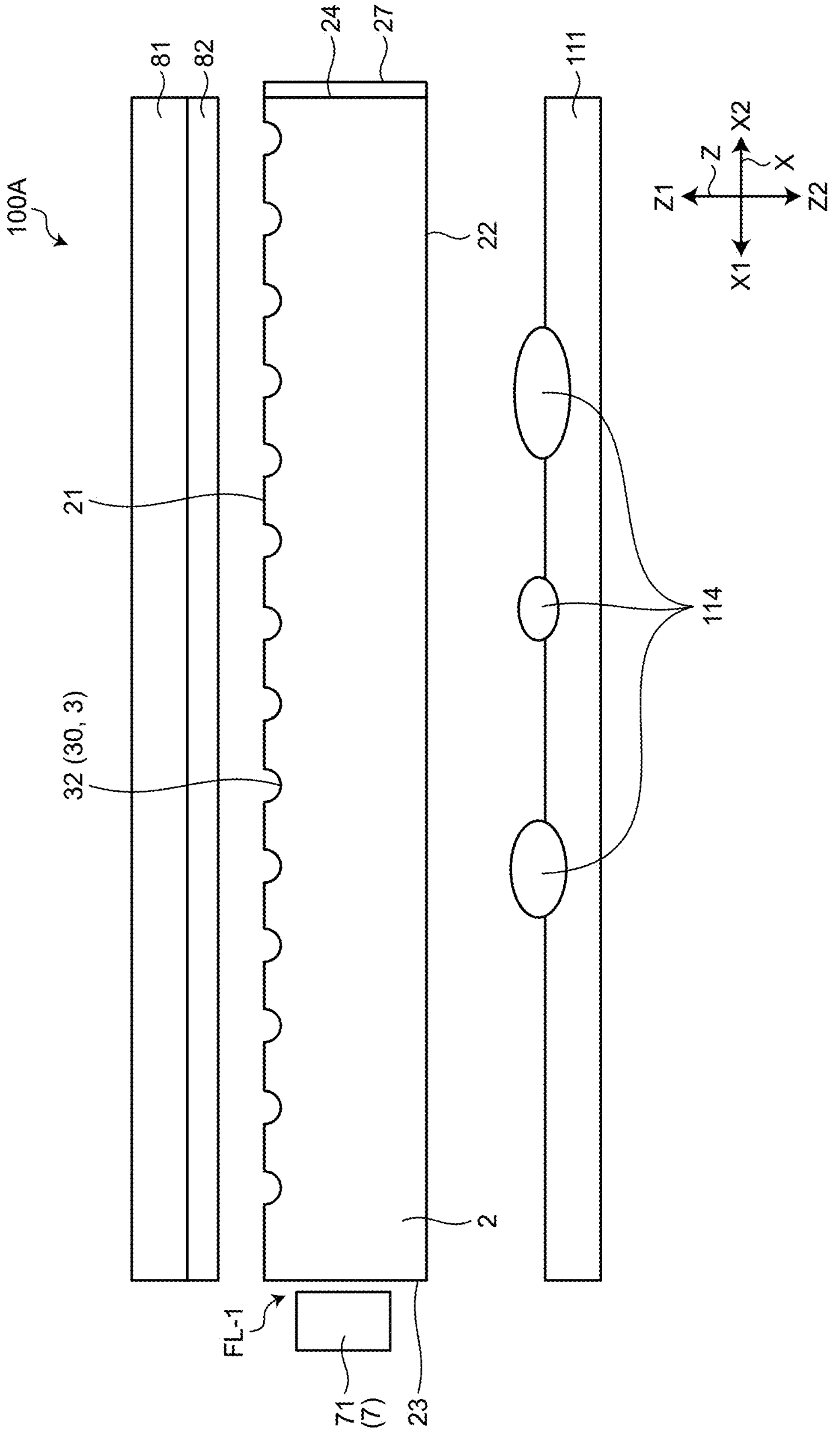
FIG. 7 is a side view schematically illustrating a detection device according to a first modification of the present disclosure.

The following describes a first modification of the present disclosure. FIG. 7 is a side view schematically illustrating a detection device according to the first modification. A detection device 100A according to the first modification differs from the detection device 100 according to the first embodiment in shape of the optical structure 3 (scatterer 30). The following describes the first modification focusing on the optical structure 3.

As illustrated in FIG. 7, the optical structure 3 (scatterer 30) provided in a front light FL-1 according to the first modification is the recessed scatterer 32. The recessed scatterer 32 is a hemispherical dent (recess) that is dented from the first surface 21 of the light guide plate 2 toward the Z2 side. The recessed scatterer 32 has the first diameter d when viewed in the Z direction. Part of the light 120 propagating in the light guide plate 2 is scattered by the recessed scatterer 32. In the same manner as the protruding scatterers 31, the recessed scatterers 32 are arranged at even intervals in the X and Y directions in a matrix having a row-column configuration.

As described above, the scatterer 30 is the recessed scatterer 32 that scatters the light 120 propagating in the light guide plate 2. The recessed scatterer 32 scatters part of the light 120 propagating in the light guide plate 2, and thus the recessed scatterer 32 can output the light 120 that has propagated in the light guide plate 2 toward the object to be detected 114 placed on the opposite side to the optical sensor 81 side, in the same manner as the protruding scatterer 31 of the first embodiment. Therefore, the accuracy of detection of the object to be detected 114 increases.

Second Modification

Figure 8:
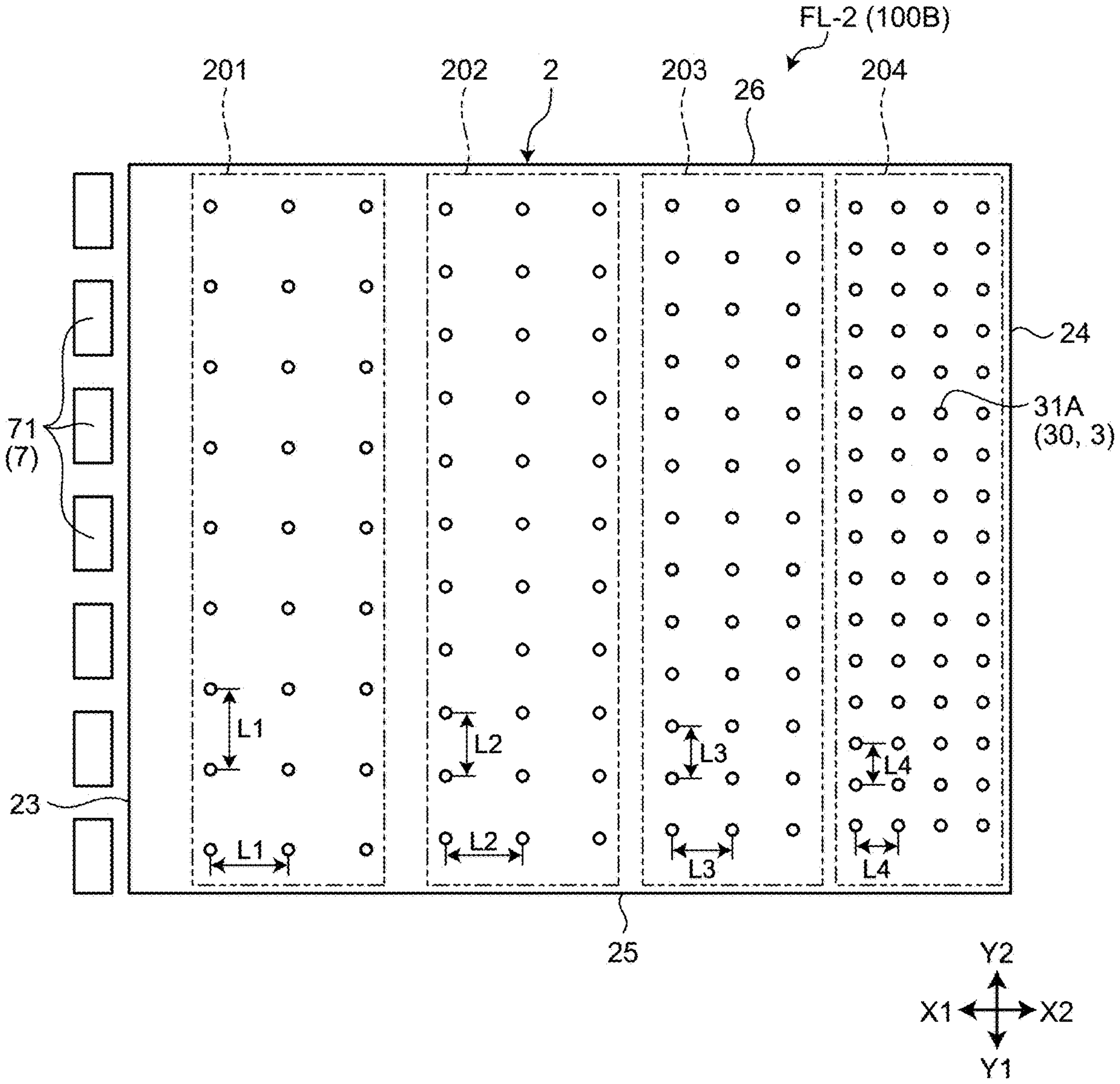
FIG. 8 is a plan view schematically illustrating a front light according to a second modification of the present disclosure.

The following describes a second modification of the present disclosure. FIG. 8 is a plan view schematically illustrating the front light according to the second modification.

A detection device 100B according to the second modification differs from the detection device 100 according to the first embodiment in density of arrangement of the optical structures 3 (scatterers 30). The following describes the second modification focusing on the optical structure 3.

As illustrated in FIG. 8, the optical structure 3 provided in a front light FL-2 according to the second modification is a protruding scatterer 31A. The protruding scatterer 31A is a hemispherical projection projecting from the first surface 21 of the light guide plate 2 toward the Z1 side.

In plan view of the light guide plate 2 as viewed from the Z1 side, the light guide plate 2 has rectangular regions 201, 202, 203, and 204 having the same area as one another. Specifically, the regions 201, 202, 203, and 204 are arranged in this order from the X1 side toward the X2 side.

In the region 201, the protruding scatterers 31A are arranged in the X and Y directions in a matrix having a row-column configuration. The distance between the protruding scatterers 31A adjacent in the X direction is a distance L1. The distance between the protruding scatterers 31A adjacent in the Y direction is also the distance L1. In the region 201, the protruding scatterers 31A are arranged in 9 rows and 3 columns. Thus, the number of the protruding scatterers 31A included in the region 201 is 27.

In the region 202, the protruding scatterers 31A are arranged in the X and Y directions in a matrix having a row-column configuration. The distance between the protruding scatterers 31A adjacent in the X direction is a distance L2. The distance between the protruding scatterers 31A adjacent in the Y direction is also the distance L2. In the region 202, the protruding scatterers 31A are arranged in 11 rows and 3 columns. Thus, the number of the protruding scatterers 31A included in the region 202 is 33.

In the region 203, the protruding scatterers 31A are arranged in the X and Y directions in a matrix having a row-column configuration. The distance between the protruding scatterers 31A adjacent in the X direction is a distance L3. The distance between the protruding scatterers 31A adjacent in the Y direction is also the distance L3. In the region 203, the protruding scatterers 31A are arranged in 13 rows and 3 columns. Thus, the number of the protruding scatterers 31A included in the region 203 is 39.

In the region 204, the protruding scatterers 31A are arranged in the X and Y directions in a matrix having a row-column configuration. The distance between the protruding scatterers 31A adjacent in the X direction is a distance L4. The distance between the protruding scatterers 31A adjacent in the Y direction is also the distance L4. In the region 204, the protruding scatterers 31A are arranged in 16 rows and 4 columns. Thus, the number of the protruding scatterers 31A included in the region 204 is 64. As described above, the number of the protruding scatterers 31A is 27 in the region 201, 33 in the region 202, 39 in the region 203, and 64 in the region 204.

When one of the regions 201, 202, 203, and 204 is denoted as a first region, and a region located on the X2 side of the first region is denoted as a second region, the number of the protruding scatterers 31A included in the second region is larger than the number of the protruding scatterers 31A included in the first region. For example, when the region 202 is denoted as the first region and the region 204 is denoted as the second region, the number of the protruding scatterers 31A included in the region 204 as the second region (64) is larger than the number of the protruding scatterers 31A included in the region 202 as the first region (33). The density of arrangement of the scatterers 30 may be increased in a gradation way. That is, the density of arrangement of the scatterers 30 may be gradually increased from the X1 side toward the X2 side.

As described above, the first surface 21 of the light guide plate 2 has the first region and the second region. The number of the scatterers 30 included in the second region is larger than the number of the scatterers 30 included in the first region.

In other words, the density of arrangement of the scatterers 30 is increased as distance from the light sources (light source) 71 is increased. The scatterers 30 have a function to output the light 120 that has propagated in the light guide plate 2 toward the object to be detected 114 placed on the opposite side to the optical sensor 81 side.

The amount of the light 120 propagating in the light guide plate 2 is decreased as distance from the light sources (light source) 71 is increased. Therefore, the scatterers 30 is provided such that the density of arrangement of the scatterers 30 is increased as distance from the light sources (light source) 71 is increased, whereby the accuracy of detection of the object to be detected 114 can be increased even with a smaller amount of the light 120.

Third Modification

Figure 9:
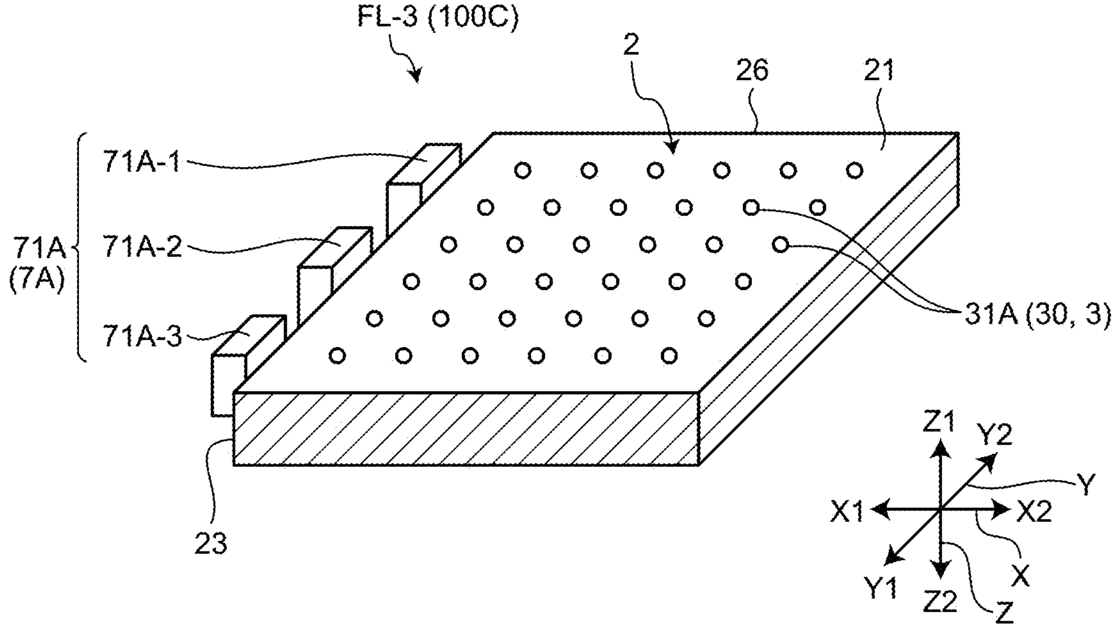
FIG. 9 is a perspective view schematically illustrating a partial section of a front light according to a third modification of the present disclosure.
Figure 10:
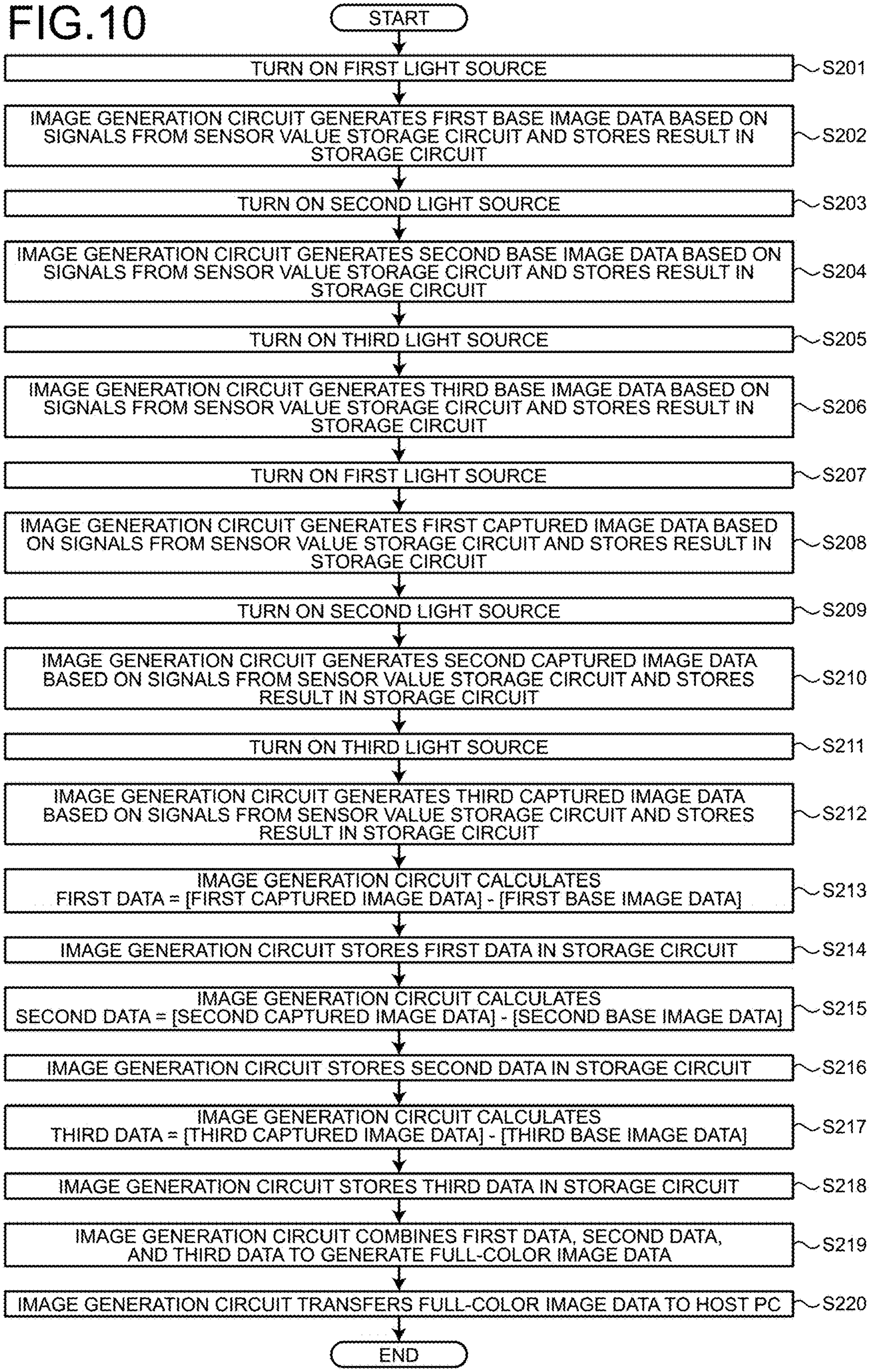
FIG. 10 is a flowchart illustrating a detection operation example of a detection device according to the third modification.

The following describes a third modification of the present disclosure. FIG. 9 is a perspective view schematically illustrating a partial section of a front light according to the third modification. FIG. 10 is a flowchart illustrating a detection operation example of a detection device according to the third modification.

As illustrated in FIG. 9, a detection device 100C according to the third modification includes a front light FL-3. The front light FL-3 includes a light source device 7A. The light source device 7A includes three light sources (light source) 71A. Specifically, the light sources 71A include a light source (first light source) 71A-1, a light source (second light source) 71A-2, and a light source (third light source) 71A-3. The first light source 71A-1 emits first light. The second light source 71A-2 emits second light having a different wavelength band from the first light. The third light source 71A-3 emits third light having a different wavelength band from the first and the second light. The first light corresponds to red, for example, and the wavelength band of the first light is from 610 nm to 780 nm. The second light corresponds to green, for example, and the wavelength band of the second light is from 500 nm to 570 nm. The third light corresponds to blue, for example, and the wavelength band of the third light is from 460 nm to 500 nm.

A first period is a period during which the light source (first light source) 71A-1 is on (lit), a second period is a period during which the light source (second light source) 71A-2 is on (lit), and the third period is a period during which the light source (third light source) 71A-3 is on (lit). The first period, the second period, and the third period differ from one another.

The term "first data" denotes image data obtained from the light detected by the optical sensor 81 during the first period. The term "second data" denotes image data obtained from the light detected by the optical sensor 81 during the second period. The term "third data" denotes image data obtained from the light detected by the optical sensor 81 during the third period. The image generation circuit 756 (refer to FIG. 4) combines the first data, the second data, and the third data to obtain the result of detection in the state where the object to be detected 114 is placed on the placement substrate 111.

The following describes the detection operation example of the detection device according to the third modification with reference to FIG. 10 and other drawings.

First, the lighting pattern generation circuit 754 (refer to FIG. 4) transmits a signal to turn on the light source (first light source) 71A-1 (Step S201).

Then, the image generation circuit 756 (refer to FIG. 4) generates first base image data based on signals from the sensor value storage circuit 751 and stores the result (first base image data) in the storage circuit 757 (Step S202).

The lighting pattern generation circuit 754 transmits a signal to turn on the light source (second light source) 71A-2 (Step S203).

Then, the image generation circuit 756 generates second base image data based on signals from the sensor value storage circuit 751 and stores the result (second base image data) in the storage circuit 757 (Step S204).

The lighting pattern generation circuit 754 transmits a signal to turn on the light source (third light source) 71A-3 (Step S205).

Then, the image generation circuit 756 generates third base image data based on signals from the sensor value storage circuit 751 and stores the result (third base image data) in the storage circuit 757 (Step S206).

The lighting pattern generation circuit 754 transmits a signal to turn on the light source (first light source) 71A-1 (Step S207).

The image generation circuit 756 generates first captured image data based on signals from the sensor value storage circuit 751 and stores the result (first captured image data) in the storage circuit 757 (Step S208).

The lighting pattern generation circuit 754 transmits a signal to turn on the light source (second light source) 71A-2 (Step S209).

The image generation circuit 756 generates second captured image data based on signals from the sensor value storage circuit 751 and stores the result (second captured image data) in the storage circuit 757 (Step S210).

The lighting pattern generation circuit 754 transmits a signal to turn on the light source (third light source) 71A-3 (Step S211).

The image generation circuit 756 generates third captured image data based on signals from the sensor value storage circuit 751 and stores the result (third captured image data) in the storage circuit 757 (Step S212).

The image generation circuit 756 calculates the first data=(first captured image data)−(first base image data) (Step S213). The first data is the difference image data obtained by subtracting the first base image data from the first captured image data. The first data is calculated by the image generation circuit 756.

The image generation circuit 756 stores the first data in the storage circuit 757 (Step S214).

The image generation circuit 756 calculates the second data=(second captured image data)—(second base image data) (Step S215). The second data is the difference image data obtained by subtracting the second base image data from the second captured image data. The second data is calculated by the image generation circuit 756.

The image generation circuit 756 stores the second data in the storage circuit 757 (Step S216).

The image generation circuit 756 calculates the third data=(third captured image data)−(third base image data) (Step S217). The third data is the difference image data obtained by subtracting the third base image data from the third captured image data. The third data is calculated by the image generation circuit 756.

The image generation circuit 756 stores the third data in the storage circuit 757 (Step S218).

The image generation circuit 756 combines the first data, the second data, and third data to generate full-color image data and stores the result (full-color image data) in the storage circuit 757 (Step S219).

The image generation circuit 756 transfers the full-color image data to the host PC 758 (refer to FIG. 4) (Step S220).

As described above, the light sources (light source) 71A include the light source (first light source) 71A-1, the light source (second light source) 71A-2, and the light source (third light source) 71A-3.

The detection device 100C includes the image generation circuit 756 that obtains the result of detection in the state where the object to be detected 114 is placed on the placement substrate 111 by combining the first data obtained from the light detected by the optical sensor 81 during the first period, the second data obtained from the light detected by the optical sensor 81 during the second period, and the third data obtained from the light detected by the optical sensor 81 during the third period.

With this configuration, the three pieces of image data can be obtained by the light of the three light sources 71A, and the result of detection in the state where the object to be detected 114 is placed on the placement substrate 111 can be obtained by combining the three pieces of image data. Consequently, higher accuracy of detection can be achieved compared with the case where image data obtained by light of one light source 71 is used.

What is claimed is:

1. A detection device comprising:

a placement substrate capable of having an object to be detected placed thereon;

a light guide plate that is disposed on one side in a first direction of the placement substrate so as to overlap the placement substrate and has a light-transmitting property:

an optical sensor that is disposed on one side in the first direction of the light guide plate so as to overlap the light guide plate and comprises a plurality of photodetection elements arranged in a planar configuration; and a light source that is disposed adjacent to the light guide plate in a second direction intersecting the first direction and is configured to emit light to a side surface of the light guide plate, wherein the light guide plate is provided with an optical structure configured to transmit, toward the placement substrate, the light incident from the light source, a plurality of the optical structures are provided, and the optical structures are provided on a first surface of the light guide plate on the optical sensor side thereof, the optical structures are scatterers configured to scatter the light that has propagated in the light guide plate and reached the scatterers, the first surface of the light guide plate has a first region and a second region that have the same area and are positioned on one side of the light source in the second direction, the second region is located on one side of the first region in the second direction, and the number of the scatterers included in the second region is larger than the number of the scatterers included in the first region.

2. The detection device according to claim 1, wherein an optical filter is provided between the light guide plate and the optical sensor.

3. The detection device according to claim 1, wherein the light source comprises a first light source configured to emit first light, a second light source configured to emit second light having a different wavelength band from the first light, and a third light source configured to emit third light having a different wavelength band from the first and the second light.

4. The detection device according to claim 1, comprising:

a storage circuit configured to store base image data obtained by detecting the light emitted from the light source using the optical sensor in a state where the object to be detected is not placed on the placement substrate; and an image generation circuit configured to acquire captured image data obtained by detecting the light emitted from the light source using the optical sensor in a state where the object to be detected is placed on the placement substrate, and obtain, from a difference between the base image data and the captured image data, difference image data indicating a detection result in a state where the object to be detected is placed on the placement substrate.

5. The detection device according to claim 3, wherein a first period during which the first light source is lit, a second period during which the second light source is lit, and a third period during which the third light source is lit are different from one another, and the detection device comprises an image generation circuit configured to obtain a detection result in a state where the object to be detected is placed on the placement substrate by combining first data obtained from the light detected by the optical sensor during the first period, second data obtained from the light detected by the optical sensor during the second period, and third data obtained from the light detected by the optical sensor during the third period.

6. A detection device comprising:

a placement substrate capable of having an object to be detected placed thereon;

a light guide plate that is disposed on one side in a first direction of the placement substrate so as to overlap the placement substrate and has a light-transmitting property;

an optical sensor that is disposed on one side in the first direction of the light guide plate so as to overlap the light guide plate and comprises a plurality of photodetection elements arranged in a planar configuration; and a light source that is disposed adjacent to the light guide plate in a second direction intersecting the first direction and is configured to emit light to a side surface of the light guide plate, wherein the light guide plate is provided with an optical structure configured to transmit, toward the placement substrate, the light incident from the light source, a plurality of the optical structures are provided, and the optical structures are provided on a first surface of the light guide plate on the optical sensor side thereof, the optical structures are scatterers configured to scatter the light that has propagated in the light guide plate and reached the scatterers, each of the scatterers has a circular shape having a first diameter when viewed in the first direction, and a minimum value of a distance between adjacent two of the scatterers is equal to or larger than three times the first diameter.

7. The detection device according to claim 6, wherein an optical filter is provided between the light guide plate and the optical sensor.

8. The detection device according to claim 6, wherein the light source comprises a first light source configured to emit first light, a second light source configured to emit second light having a different wavelength band from the first light, and a third light source configured to emit third light having a different wavelength band from the first and the second light.

9. The detection device according to claim 6, comprising:

a storage circuit configured to store base image data obtained by detecting the light emitted from the light source using the optical sensor in a state where the object to be detected is not placed on the placement substrate; and an image generation circuit configured to acquire captured image data obtained by detecting the light emitted from the light source using the optical sensor in a state where the object to be detected is placed on the placement substrate, and obtain, from a difference between the base image data and the captured image data, difference image data indicating a detection result in a state where the object to be detected is placed on the placement substrate.

10. A detection device comprising:

a placement substrate capable of having an object to be detected placed thereon;

a light guide plate that is disposed on one side in a first direction of the placement substrate so as to overlap the placement substrate and has a light-transmitting property;

an optical sensor that is disposed on one side in the first direction of the light guide plate so as to overlap the light guide plate and comprises a plurality of photodetection elements arranged in a planar configuration; and a light source that is disposed adjacent to the light guide plate in a second direction intersecting the first direction and is configured to emit light to a side surface of the light guide plate, wherein the light guide plate is provided with an optical structure configured to transmit, toward the placement substrate, the light incident from the light source, a plurality of the optical structures are provided, and the optical structures are provided on a first surface of the light guide plate on the optical sensor side thereof, the optical structures are scatterers configured to scatter the light that has propagated in the light guide plate and reached the scatterers, an optical filter is provided between the light guide plate and the optical sensor, each of the scatterers has a circular shape having a first diameter when viewed in the first direction, the optical filter comprises a light-blocking portion and a light guide portion, and the light-blocking portion has higher absorbance of the light than the light guide portion, and a maximum distance of the light guide portion along the second direction is larger than the first diameter of the scatterer.

11. The detection device according to claim 10, wherein the light source comprises a first light source configured to emit first light, a second light source configured to emit second light having a different wavelength band from the first light, and a third light source configured to emit third light having a different wavelength band from the first and the second light.

12. The detection device according to claim 10, comprising:

a storage circuit configured to store base image data obtained by detecting the light emitted from the light source using the optical sensor in a state where the object to be detected is not placed on the placement substrate; and an image generation circuit configured to acquire captured image data obtained by detecting the light emitted from the light source using the optical sensor in a state where the object to be detected is placed on the placement substrate, and obtain, from a difference between the base image data and the captured image data, difference image data indicating a detection result in a state where the object to be detected is placed on the placement substrate.

13. A detection device comprising:

a light guide plate having a light-transmitting property;

an optical sensor that is disposed on one side in a first direction of the light guide plate so as to overlap the light guide plate and comprises a plurality of photodetection elements arranged in a planar configuration;

a light source that is arranged adjacent to the light guide plate in a second direction intersecting the first direction and is configured to emit light to a side surface of the light guide plate; and an optical structure that is provided on the light guide plate and is configured to transmit, toward the other side in the first direction, the light incident from the light source, wherein the first surface of the light guide plate has a first region and a second region that are positioned on one side of the light source in the second direction, the second region is located on one side of the first region in the second direction, and the number of scatterers included in the second region is larger than the number of the scatterers included in the first region.

14. The detection device according to claim 13, comprising:

a storage circuit configured to store base image data obtained by placing a subject having uniform reflectance within a detection surface and detecting the subject; and an image generation circuit configured to acquire captured image data obtained by detecting the light emitted from the light source using the optical sensor in a state where an object to be detected is placed on a placement substrate, and obtain, from a difference between the base image data and the captured image data, difference image data indicating a detection result in a state where the object to be detected is placed on the placement substrate.

15. The detection device according to claim 13, wherein an optical filter is provided between the light guide plate and the optical sensor.

16. The detection device according to claim 13, wherein the light source comprises a first light source configured to emit first light, a second light source configured to emit second light having a different wavelength band from the first light, and a third light source configured to emit third light having a different wavelength band from the first and the second light.

17. The detection device according to claim 13, comprising:

a storage circuit configured to store base image data obtained by detecting the light emitted from the light source using the optical sensor in a state where an object to be detected is not placed on a placement substrate; and an image generation circuit configured to acquire captured image data obtained by detecting the light emitted from the light source using the optical sensor in a state where the object to be detected is placed on the placement substrate, and obtain, from a difference between the base image data and the captured image data, difference image data indicating a detection result in a state where the object to be detected is placed on the placement substrate.

* * * * *